Patented Mar. 23, 1954

2,673,157

UNITED STATES PATENT OFFICE 2,673,157

LOW-METHOXYL PECTIN GELS AND METHOD OF MAKING THE SAME

Allan D. Shepherd, El Cerrito, and Rolland M. McCready and Harry S. Owens, Berkeley, Calif., assignors to the United States of America as represented by the Secretary of Agriculture No Drawing. Application May 24, 1950, Serial No. 164,022

15 Claims. (Cl. 99—132)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to low-methoxyl pectin gels, particularly gels of this type which are suitable for use as foodstuffs.

An object of this invention is the provision of methods for preparing low-methoxyl pectin gels, especially edible low-methoxyl pectin gels. Another object of the invention is the provision of novel compositions of matter which may be used for preparing low-methoxyl pectin gels, especially edible low-methoxyl pectin gels. Another object of the invention is the provision of methods for preparing said novel compositions of matter. Further objects of this invention will be obvious from the description herein.

It is to be noted that the instant invention deals with low-methoxyl pectins. These compounds are to be distinguished from the related compounds pectin and pectic acid. Pectin is a polygalacturonide prepared from plant extracts by alcohol, acetone, or metallic salt precipitation with no attempt to modify its natural methoxyl content. Pectic acid is a completely de-methoxylated pectin, that is, the pectin nucleus is retained but the carbomethoxy groups (—COOCH$_3$) have all been de-esterified to carboxyl groups (—COOH). Low-methoxyl pectins are derived from pectin or pectin source materials by partial de-methoxylation and contain both carbomethoxy and carboxyl groups. The low-methoxyl pectins prepared by acid or alkaline de-methoxylation having a methoxyl content from about 2% to about 5% and the low-methoxyl pectins prepared by enzymatic de-methoxylation having a methoxyl content from about 2% to about 7% are preferred for use in the process and products of this invention. The low-methoxyl pectins, when in their acid (unsalified) state are often referred to as low-methoxyl pectinic acids and when salified as low-methoxyl pectinates. Usually, the low-methoxyl pectins are employed in the latter state as they are readily soluble in water in such form and further are more stable, the rate of demethoxylation and degradation on storage being much less than in the acid form. Thus at some stage in their preparation, the low-methoxyl pectins are at least partially neutralized with an alkaline material such as an alkali metal or ammonium hydroxide, carbonate, or bicarbonate. Usually, sufficient of the alkaline material is added so that the partly neutralized product when dissolved in water as a 1% solution will exhibit a pH of about 4 to about 5, preferably 4.5. Strictly speaking, such derivatives should be termed a sodium (potassium or ammonium) hydrogen low-methoxyl pectinate but because of the length of this expression, it is generally not used in the industry. It is evident from the above that by the expression "low-methoxyl pectin" as herein used is meant the partially de-methoxylated derivatives of pectin or pectin source materials, these derivatives having a methoxyl content from about 2% to about 7% and being preferably salified or at least partially salified as their alkali metal or ammonium salts. Methods for the preparation, isolation and neutralization of low-methoxyl pectin are disclosed in the following U. S. patents: Lineweaver and McCready, No. 2,386,232; Owens and Maclay, No. 2,444,266; McCready, Owens, and Maclay, No. 2,448,818; Maclay et al., No. 2,457,577; Maclay and McCready, No. 2,478,170; Owens, McCready, and Maclay, No. 2,495,756; and Owens, McCready, and Maclay, No. 2,496,306.

It is well known in the art that low-methoxyl pectins can be used to prepare edible gels. One very important property of the low-methoxyl pectins is that they form gels in the presence of calcium or other polyvalent metal ions and do not require sugar to gel as is the case with ordinary pectin. Usually if the low-methoxyl pectin gel is to be eaten as a dessert, sugar is added in moderate quantity although it is to be emphasized that the sugar is added only for proper taste and is not essential to form the gel. Low-methoxyl pectin gels have generally been prepared by two methods: (1) the hot process and (2) the cold process. (1) In the hot process, the low-methoxyl pectin, the calcium source, sugar, and other ingredients are incorporated with water or other edible liquid and the mixture is heated and stirred to obtain a smooth dispersion. Upon cooling, the gel forms. In this hot process, the sequence of introduction of ingredients is not critical. (2) However, if the cold process is used, that is, if no heat is to be applied to the dispersion, then a complication enters the picture. Thus it is essential, when the ingredients are incorporated without application of heat in water or other edible liquid, that the low-methoxyl pectin be dispersed in the liquid medium before it makes effective contact with the calcium ions. Unless such precaution is taken, no gel at all will be formed, or if a gel is formed it will be of gritty or lumpy texture and totally unacceptable. The theory which underlies this situation is that the low-methoxyl pectins dissolve relatively slowly in water. Thus if the low-methoxyl pectin together with the requisite amount of calcium salt is stirred into water, the calcium salt dissolves rapidly and the calcium ions contact the low-methoxyl pectin particles which are still undispersed and thus a coating of insoluble calcium low-methoxyl pectinate gel is formed around each particle of low-methoxyl pectin. As a result one then has a suspension of particles of low-methoxyl pectin, each particle coated with calcium low-methoxyl pectinate. Since the calcium low-methoxyl pectinate is insoluble in water, the coating effectively prevents any solution of the low-methoxyl pectin and further stirring simply is useless—the mixture remains a lumpy or gritty suspension and will not gel on standing. These facts have to a considerable extent retarded the exploitation of the low-methoxyl pectins for use in cold process gel mixes. Because of the above-outlined facts, the ingredients could not be all mixed in one package as under such conditions the proper sequence of addition to water could not be carried out. Therefore, it was necessary to put up the mix in a two-package form. The first package contained the low-methoxyl pectin and all or part of the sugar, while the second package contained the calcium salt (or its equivalent in the form of dry milk), the remainder of the sugar, flavoring agents and so forth. In using such a product it was essential that the consumer initially dissolve the first package in water and then add the second package and stir until properly dispersed. If this order were disregarded, an unsatisfactory lumpy melange would result. This type of two-package mix did not find favor with most consumers because of the necessity for following a too rigorous scheme of preparation. Although these problems have been known to the art for many years, no successful solution to the problem has been attained.

We have now found that if the low-methoxyl pectin is employed in a particular form—as a solid solution in sugar—the problems of sequence of dissolving are completely eliminated. By applying the principles of our invention, the various ingredients may be incorporated in the cold into water all at once. Thus our invention makes possible for the first time the use of a simple one-package mix containing all the dry ingredients required for the gel. Our invention is based on the fact that when the low-methoxyl pectin in the form of a solid solution in sugar is incorporated in water or other edible liquid, the low-methoxyl pectin goes into solution rapidly and hence does not leave any undissolved particles to cause localized gelling. The one-package dry mix produced in accordance with our invention makes possible the preparation of cold process gels by a very simple and foolproof procedure. By emptying the contents of the package into water or other edible liquid and agitating for a few minutes, and then allowing to stand for a few minutes, an edible gel of uniform texture is produced. Thus by the application of our invention, the necessity for using a two-package mix is eliminated with its attendant complications of requiring a particular order of dissolving.

In the preparation of the low-methoxyl pectin-sugar solid solution many alternative procedures may be used. First an aqueous solution of sugar and low-methoxyl pectin is prepared. This aqueous solution should contain at least about 10 parts sugar for each part of low-methoxyl pectin. The proportion of sugar may be increased as much as desired above this lower limit although it is evident that as the sugar proportion is raised, the gel produced from the resulting solid solution will be progressively sweeter. Usually, we employ an upper limit of about 20 parts sugar per part of low-methoxyl pectin thus to prepare gels which are not excessively sweet. The amount of water in the solution is immaterial save that sufficient should be used to dissolve the sugar and low-methoxyl pectin. The aqueous solution is then dried to prepare the solid solution. In general, we prefer to accomplish the drying by use of a drum-drier or spray-drier since these procedures give products in a form most suitable for use in a dry gel mix. In drum-drying the solution we prefer to use a solution containing not more than 15 parts sugar per part of low-methoxyl pectin as in this type of drying it is essential to form a film of the dry material on the drum. The pectin in the solution acts as a film-forming material and markedly assists in proper operation of the drum drying. When the proportion of sugar to low-methoxyl pectin is increased substantially over the ratio of 15:1, then the pectin is present in too small proportion to form a self-sustaining film. In general we prefer to use sucrose as the sugar for preparing the solid solution primarily because sucrose solutions are easily dried to form a friable, dry product. However, the use of sucrose is not critical and other sugars may be employed as for example, dextrose, lactose, and so forth.

In the preparation of the one-package mix to be used for the preparation of gels by incorporation thereof with water or other edible liquid, two ingredients are essential: (1) the solid solution of low-methoxyl pectin in sugar and (2) a calcium source. For preparing a dry mix adapted to be added to one cup (240 ml.) of liquid we use sufficient solid solution to provide about 3 grams of low-methoxyl pectin. This amount is not critical and may be varied considerably depending on whether a weak or a firm gel is desired, smaller amounts of low-methoxyl pectin giving a weaker gel, and vice versa. In general, the amount of low-methoxyl pectin in the dry mix should be in such proportion that when the dry mix is incorporated in water or other edible liquid the pectin concentration will be from about 0.5% to about 1.5%. As the calcium source, we preferably use dried milk (whole or skim) since this material aids in the food value and palatability of the gel and further dried milk liberates its calcium ions slowly. Part, or in some cases, all of the dried milk may be replaced by other suitable calcium sources as, for example, dried carrot powder or other dried fruit or vegetable materials which contain sufficient calcium to cause gelation. The proportion of calcium source to low-methoxyl pectin can be varied widely, i. e., from about 10 to about 40 milligrams or more of Ca per gram of low-methoxyl pectin. The proportion to be used in any case depends upon the degree of firmness of gel and rate of set desired. In general increasing ratios of calcium give a firmer gel and increase the rate of set. When using a food, such as dried milk as a source of calcium, it is not necessary to consider proportions as the addition of any reasonable amount of dried milk to give a proper lacteal flavor and texture to the finished gell will supply adequate calcium and any excess of calcium will not be detrimental. Thus we usually use a proportion of about 3 to about 20 parts of dried milk per part of low-methoxyl pectin, depending on the taste desired, generally about 10 parts dried milk per part of low-methoxyl pectin gives an excellent tasting product. When the gel mix is prepared with dried milk, it is usually advisable to incorporate an alkaline material such as an alkali metal carbonate or bicarbonate in the mix so that the gel will have a pH approximating that of fluid milk (6.8–7.0). Since the low-methoxyl pectin is somewhat acidic though partly salified, the added alkaline material will counteract this acidity and the final product will be essentially neutral. Further, addition of the alkaline material increases stability of the gel against syneresis and retards setting time of the gel so that the mixture will not set unduly fast thus giving the cook time to pour the mixture out of the stirring bowl into molds or the like.

In addition to the solid solution of low-methoxyl pectin in sugar and calcium source, the gel mix may contain any desired flavoring agent, natural or synthetic, as for example vanilla, chocolate, cocoa, maple nut, black walnut, mocha, coffee, cherry, strawberry, loganberry, apricot, banana, grape, etc. Dried fruit powders may be used for flavoring and/or for increasing the food value of the gel. Thus one may incorporate dried apple, orange, lemon, strawberry, or other fruit powders. Certified colors may be incorporated in the mix to give the gel any desired hue. Further, to the mix may be added any desired supplement such as vitamins, vitamin precursors, mineral salts, and so forth. For control of tartness any non-toxic alkaline material or acid may be added. Suitable alkaline materials are the alkali metal carbonates or bicarbonates. Suitable acids are citric, tartaric, malic, and so forth. It is believed evident from the above that the dry gel mix contains essentially the solid solution of low-methoxyl pectin in sugar and the calcium source. In addition to these critical agents, one may add to the mix any desired food, flavoring and other material which may be desired to be present in the final gel.

In preparing the dry gel mix it is of course essential to intimately mix the ingredients. To ensure proper mixing, it is preferable to pass the mix through a mill—a coffee mill, for example, whereby to break up any large pieces of material and to grind and intimately blend the ingredients. Having thoroughly mixed the ingredients, the product is packaged, for example, in cartons or cellophane bags.

In preparing the gel the dry gel mix is incorporated in water or other edible liquid and allowed to stand for a few minutes to permit the gel to set. No heating is required during the incorporation and usually the procedure is conducted at room temperature as being most convenient. Further, no cooling of the incorporated mixture is required as the gel will form at room temperature. In the incorporation with water or other edible liquid, vigorous mixing must be employed as for example beating with an electric mixer or a hand egg beater or pastry whip. The liquid used for forming the gel depends on the type of gel desired and on the composition of the dry mix. For example if the dry mix already contains the proper food and/or flavoring ingredients then water is used. Thus if dry milk powder is used in the mix as the source of calcium then water is used. Naturally it is most convenient to the consumer to have all the ingredients in the dry mix whereupon water is the only essential liquid ingredient. However, if desired all or part of the flavorings may be omitted from the dry mix, in such case one would then use a liquid having the desired flavor, thus the liquid could be a fruit or a vegetable juice or puree. If desired one could also use a fruit beverage such as orangeade, lemonade, or other properly flavored edible liquid.

The following examples demonstrate the invention in greater detail. It is understood that these examples are furnished only by way of illustration and not limitation.

EXAMPLE I

*Preparation of solid solution of low-methoxyl pectin in sugar by drum-drying*

A solution was prepared with the following composition:

| | Grams |
|---|---|
| Low-methoxyl pectin (methoxyl content 3.5%) | 100 |
| Sucrose | 1,500 |
| Water | 1,500 |

The solution was prepared by mixing the low-methoxyl pectin with part of the sugar (about 500 g.) in the dry and sprinkling this mixture into the water while agitating by a motor-driven stirrer. After solution was complete, the remainder of the sugar was added and stirring was continued until it was completely dissolved.

The resulting solution was fed to a conventional laboratory double drum drier. The drums were under 45 lbs. per sq. in. steam pressure, the spacing between drums was 0.0035 in. The length of time from pick-up of the film to removal by the knife was about 40 seconds.

The solid solution of low-methoxyl pectin in sugar was obtained in the form of a white opaque film which was broken up into flakes.

EXAMPLE II

*Preparation of solid solution of low-methoxyl pectin in sugar by spray-drying*

A solution was prepared with the following composition:

| | Grams |
|---|---|
| Low-methoxyl pectin (methoxyl content 3.5%) | 50 |
| Sucrose | 1,000 |
| Water | 1,500 |

The solution was prepared by mixing the low-methoxyl pectin with part of the sugar (about 500 g.) in the dry and sprinkling this mixture into the water while agitating with a motor-driven stirrer. After solution was complete, the remainder of the sugar was added and stirring was continued until it was completely dissolved.

The solution was spray-dried in a conventional laboratory spray drier using a feed rate of 35–40 g. per minute. The air entering the spray dryer was at a temperature of 150° C. and the temperature in the exhaust and receiver was 40° C. The solid solution of low-methoxyl pectin in sugar was obtained in the form of a fine, white, free flowing powder.

EXAMPLE III

A one-package pudding mix was prepared by thoroughly mixing and grinding in a coffee mill the following dry ingredients:

| | |
|---|---|
| Low-methoxyl pectin-sugar solid solution, as prepared in Example I | g 48 |
| Sucrose | g 5 |
| Cocoa | g 10 |
| Skim milk powder | g 30 |
| Salt | g 1 |
| Sodium carbonate | g 0.25 |
| Vanilla | q. s. |

The above mixture was then added to 1 cup (½ pint) of water and stirred vigorously with an electric stirrer until the ingredients were thoroughly incorporated. The mixture was then allowed to stand for 5 minutes to allow the mixture to gel. The gel or pudding so produced had a uniform texture and excellent flavor.

EXAMPLE IV

A one-package pudding mix was prepared by thoroughly mixing and grinding in a coffee mill the following dry ingredients:

| | |
|---|---|
| Low-methoxyl pectin-sugar solid solution, as prepared in Example II | g 63 |
| Cocoa | g 10 |
| Skim milk powder | g 30 |
| Salt | g 1 |
| Sodium carbonate | g 0.25 |
| Vanilla | q. s. |

The above mixture was then added to 1 cup (½ pint) of water and stirred vigorously with an electric stirrer until the ingredients were thoroughly incorporated. The mixture was then allowed to stand for 5 minutes to allow the mixture to gel. The gel or pudding so formed had a uniform texture and had an excellent flavor.

By the term "edible aqueous liquid" as used herein we mean to include such materials as water, milk, fruit juices, vegetable juices, fruit purees, vegetable purees, concentrated fruit or vegetable juices or purees, syrups, or any other aqueous material which is suitable for eating purposes.

The following experiment is not illustrative of this invention but is included to show that our solid solution of low-methoxyl pectin in sugar cannot be satisfactorily replaced by a mixture of low-methoxyl pectin and sugar. Thus:

The following dry ingredients were thoroughly mixed and ground in a hammermill to completely blend the ingredients:

| | |
|---|---|
| Low-methoxyl pectin (methoxyl content 3.5%) | g 3 |
| Sugar | g 50 |
| Cocoa | g 10 |
| Skim milk powder | g 30 |
| Salt | g 1 |
| Sodium carbonate | g 0.25 |
| Vanilla | q. s. |

The mixture as prepared above was added to 1 cup of water and stirred vigorously with an electric stirrer until the ingredients were thoroughly incorporated. The mixture was then allowed to stand. It was observed that the pectin had not dispersed but remained as discrete particles in the liquid forming a gritty suspension which did not gel.

Having thus described the invention, what is claimed is:

1. A one-package composition of matter suitable for preparing an edible gel by incorporation in an edible aqueous liquid without application of heat, comprising a dry mixture of a solid solution of a low-methoxyl pectin in sugar and a source of calcium, said solid solution containing at least about 10 parts sugar per part of low-methoxyl pectin.

2. A one-package composition of matter suitable for preparing an edible gel by incorporation in an edible aqueous liquid without application of heat, comprising a dry mixture of a solid solution of low-methoxyl pectin in sugar and dried milk, said solid solution containing at least about 10 parts sugar per part of low-methoxyl pectin.

3. A one-package composition of matter suitable for preparing an edible gel by incorporation in an edible aqueous liquid without application of heat, comprising a dry mixture of a solid solution of low-methoxyl pectin in sugar, dried milk, and flavoring material, said solid solution containing at least 10 parts of sugar per part of low-methoxyl pectin.

4. A process for preparing an edible gel of uniform texture which comprises incorporating in an edible aqueous liquid without application of heat an initially prepared mixture of a solid solution of low-methoxyl pectin in sugar and a source of calcium, said solid solution containing at least about 10 parts sugar per part of low-methoxyl pectin.

5. A process for preparing an edible gel of uniform texture which comprises incorporating in an edible aqueous liquid without application of heat an initially prepared mixture of a solid solution of low-methoxyl pectin in sugar and dried milk, said solid solution containing at least about 10 parts sugar per part of low-methoxyl pectin.

6. A process for preparing an edible gel of uniform texture which comprises incorporating in an edible aqueous liquid without application of heat an initially prepared mixture of a solid solution of low-methoxyl pectin in sugar, dried milk, and a flavoring material, said solid solution containing at least about 10 parts of sugar per part of low-methoxyl pectin.

7. A process for preparing a one-package composition of matter suitable for preparing an edible gel by incorporation in an edible aqueous liquid without application of heat, comprising drying an aqueous solution of low-methoxyl pectin and sugar to prepare a solid solution of low-methoxyl pectin in sugar and then mixing this solid solution with a source of calcium, said aqueous solution containing at least about 10 parts of sugar per part of low-methoxyl pectin.

8. A process for preparing a one-package composition of matter suitable for preparing an edible gel by incorporation in an edible aqueous liquid without application of heat, comprising drying an aqueous solution of low-methoxyl pectin and sugar to prepare a solid solution of low-methoxyl pectin in sugar and then mixing this solid solution with dried milk, said aqueous solution containing at least about 10 parts sugar per part of low-methoxyl pectin.

9. A process for preparing a one-package composition of matter suitable for preparing an edible gel by incorporation in an edible aqueous liquid without application of heat, comprising drying an aqueous solution of low-methoxyl pectin and sugar in a proportion of at least about 10 parts sugar per part of low-methoxyl pectin, to prepare a solid solution of low-methoxyl pectin in sugar then mixing the solid solution with dried milk and a flavoring material.

10. A process for preparing a one-package composition of matter suitable for preparing an edible gel by incorporation in an edible aqueous liquid without application of heat, comprising drum drying an aqueous solution of low-methoxyl pectin and sugar, in the proportion from about 10 to about 15 parts of sugar per part of low-methoxyl pectin then mixing and grinding the drum dried product with dried milk.

11. A process for preparing a one-package composition of matter suitable for preparing an edible gel by incorporation in an edible aqueous liquid without application of heat, comprising spray drying an aqueous solution of a low-methoxyl pectin and sugar, in the proportion of about 10 to about 20 parts sugar per part of low-methoxyl pectin, then mixing the spray-dried product with dried milk.

12. A solid solution of low-methoxyl pectin in sugar, said solution containing at least about 10 parts of sugar per part of low-methoxyl pectin.

13. A process for preparing a solid solution of low-methoxyl pectin in sugar which comprises drying an aqueous solution of a low-methoxyl pectin and sugar, in the proportion of at least about 10 parts sugar per part of low-methoxyl pectin.

14. A process for preparing a solid solution of low-methoxyl pectin in sugar which comprises drum drying an aqueous solution of a low-methoxyl pectin and sugar in the proportion of about 10 to about 15 parts sugar per part of low-methoxyl pectin.

15. A process for preparing a solid solution of low-methoxyl pectin in sugar which comprises spray drying an aqueous solution of a low-methoxyl pectin and sugar in the proportion of about 10 to about 20 parts sugar per part of low-methoxyl pectin.

ALLAN D. SHEPHERD.
ROLLAND M. McCREADY.
HARRY S. OWENS.

References Cited in the file of this patent

UNITED STATES PATENTS

| Number | Name | Date |
| --- | --- | --- |
| 2,159,194 | Wilson | May 23, 1939 |
| 2,429,660 | Zenzes | Oct. 28, 1947 |
| 2,478,170 | Maclay | Aug. 9, 1949 |
| 2,483,550 | Leo | Oct. 4, 1949 |
| 2,496,306 | Owens | Feb. 7, 1950 |
| 2,524,416 | Baker | Oct. 3, 1950 |
| 2,559,338 | Barch | July 3, 1951 |
| 2,594,439 | Baker | Apr. 29, 1952 |